(12) United States Patent
Esbensen et al.

(10) Patent No.: US 12,035,152 B2
(45) Date of Patent: Jul. 9, 2024

(54) RULE BASED ATTRIBUTE DISCOVERY

(71) Applicant: Silicon Laboratories Inc., Austin, TX (US)

(72) Inventors: Anders Lynge Esbensen, København NV (DK); Nicolas Obriot, Søborg (DK); Dereje Assefa Wassie, Ballrup (DK); An-ta Huang, Rødovre (DK)

(73) Assignee: Silicon Laboratories Inc., Austin, TX (US)

( * ) Notice: Subject to any disclaimer, the term of this patent is extended or adjusted under 35 U.S.C. 154(b) by 560 days.

(21) Appl. No.: 17/410,258

(22) Filed: Aug. 24, 2021

(65) Prior Publication Data

US 2023/0065247 A1   Mar. 2, 2023

(51) Int. Cl.
*H04W 24/02* (2009.01)
*G06N 5/025* (2023.01)
*H04W 72/0446* (2023.01)

(52) U.S. Cl.
CPC ............ *H04W 24/02* (2013.01); *G06N 5/025* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 10,554,500 | B2 * | 2/2020 | Zhang | H04L 41/0806 |
| 10,637,681 | B2 * | 4/2020 | Brandt | H04W 8/00 |
| 11,768,826 | B2 * | 9/2023 | Park | G06F 16/2228 |
| | | | | 707/736 |
| 2008/0094205 | A1 * | 4/2008 | Thorn | H04L 12/66 |
| | | | | 340/539.1 |
| 2009/0238186 | A1 * | 9/2009 | Lee | H04L 69/325 |
| | | | | 370/392 |
| 2014/0050116 | A1 * | 2/2014 | Yang | H04L 12/462 |
| | | | | 370/254 |
| 2014/0233579 | A1 * | 8/2014 | Flynn | H04L 45/44 |
| | | | | 370/401 |
| 2018/0367455 | A9 * | 12/2018 | Kwon | H04L 45/021 |
| 2023/0065247 | A1 * | 3/2023 | Esbensen | G06N 5/04 |

\* cited by examiner

*Primary Examiner* — Christopher T Wyllie
(74) *Attorney, Agent, or Firm* — NIELDS, LEMACK & FRAME, LLC

(57) ABSTRACT

A software system for use with a network controller is disclosed. The software system comprises a plurality of modules, wherein some of the modules are specific to the network protocol used by the network controller. Other modules are usable for a variety of network protocols without modification. In this way, the development of the software for a network controller may be simplified resulting in less development time. Further, this system allows for flexibility to add attributes and rules at any time without modification to most of the system. The software system includes an attribute store, a resolver engine, a frame handler, a frame transmitter and a frame receiver.

19 Claims, 7 Drawing Sheets

RULE BASED ATTRIBUTE DISCOVERY

FIELD

This disclosure describes systems and methods for discovering and modifying attributes associated with devices within a wireless network utilizing a set of rules.

BACKGROUND

In certain networks, there may be a plurality of network devices and one or more gateway controllers. These network devices may be input devices which relay information to the gateway controller, or output devices that receive information from the gateway controller. In one specific example, the network may be a smart home network.

Ascertaining and modifying the value of each state on each network device within a wireless network may be a tedious task. For example, for the Z-Wave protocol, there are three separate commands to request the value of a state or attribute, to receive that value from the network device, and to modify the value of that state. This may be further complicated because these commands may be different based on the class of the network device. Other wireless protocols may be similarly complex.

Therefore, it would be beneficial if there were a system and method that simplified this process. Further, it would be beneficial if that system and method utilizes a data model that allowed a rules-based approach to be utilized. In this way, major software components of the system may be utilized for any wireless network protocol, while the rules may be network protocol specific.

SUMMARY

A software system for use with a network controller is disclosed. The software system comprises a plurality of modules, wherein some of the modules are specific to the network protocol used by the network controller. Other modules are usable for a variety of network protocols without modification. In this way, the development of the software for a network controller may be simplified resulting in less development time. Further, this system allows for flexibility to add attributes and rules at any time without modification to most of the system. The software system includes an attribute store, a resolver engine, a frame handler, a frame transmitter and a frame receiver.

According to one embodiment, a software system for use with a network controller is disclosed, wherein the software system comprises a plurality of software modules, disposed on a non-transitory computer readable storage medium. The plurality of software modules comprise an attribute store, to store information about each node in a network and attributes associated with each node; a resolver engine to determine an action to perform based on values of the attributes in the attribute store; a frame handler, comprising a plurality of synthesizer functions to create a payload based on the action requested by the resolver engine; a frame transmitter to incorporate the payload and network specific information to form a packet and to transmit the packet to a network device; and a frame receiver to receive incoming packets and forward the incoming packets to the frame handler. In some embodiments, the resolver engine and the attribute store are configured to be operable with a plurality of different network protocols without modification. In certain embodiments, the attribute store is configured as a state tree representation, wherein each attribute has a parent, a type, a reported value and a desired value. In some embodiments, the frame handler registers rules with the resolver engine, such that for each type of attribute, a rule is registered which defines a GET synthesizer function to create the payload to obtain a value of the attribute and a SET synthesizer function to create the payload to modify the value of the attribute. In certain embodiments, the resolver engine calls the SET synthesizer function associated with an attribute if the desired value of the attribute differs from the reported value of the attribute. In some embodiments, the resolver engine calls the GET synthesizer function associated with an attribute if the reported value of the attribute is a null value. In certain embodiments, the frame transmitter obtains the network specific information to form a packet from the attribute store. In some embodiments, the frame transmitter returns status to the resolver engine and the attribute store is updated based on the status. In some embodiments, the reported value of the attribute is updated to the desired value if the network device reports that the attribute was successfully modified. In some embodiments, the reported value of the attribute is updated to a null value if the network device does not report that the attribute was successfully modified. In certain embodiments, the resolver engine receives a notification that a node is unavailable and is configured to pause all operations related to the node and any child attributes related to the node. In some embodiments, the frame transmitter determines that multiple packets are associated with one attribute and creates a multicast packet to combine the multiple packets. In certain embodiments, the frame receiver receives a packet from a network device and the reported value of an attribute is updated based on data in the packet.

According to another embodiment, a network controller is disclosed. The network controller comprises a processing unit; a network interface; and a memory device, wherein the software system described above is disposed in the memory device.

According to another embodiment, a method of operating a network controller is disclosed. The method comprises creating an attribute store in the network controller, wherein the attribute store is configured as a state tree representation, to store information about each node in a network and attributes associated with each node, wherein each attribute has a reported value and a desired value; detecting that the reported value does not match the desired value for a first attribute; finding a rule associated with the first attribute, wherein each rule comprises a GET synthesizer function and a SET synthesizer function associated with the attribute; using the SET synthesizer function defined in the rule associated with the first attribute to create a payload for a packet; obtaining network specific information from the attribute store; incorporating the network specific information and the payload into the packet; and transmitting the packet to a network device to modify a value of the first attribute. In some embodiments, the reported value of the first attribute is updated to the desired value if the network device reports that the first attribute was successfully modified. In certain embodiments, the reported value of the first attribute is updated to a null value if the network device does not report that the attribute was successfully modified.

According to another embodiment, a method of operating a network controller is disclosed. The method comprises creating an attribute store in the network controller, wherein the attribute store is configured as a state tree representation, to store information about each node in a network and attributes associated with each node, wherein each attribute has a reported value and a desired value; detecting that the reported value for a first attribute is a null value; finding a rule associated with the first attribute, wherein each rule comprises a GET synthesizer function and a SET synthesizer function associated with the attribute; using the GET synthesizer function defined in the rule associated with the first attribute to create a payload for a packet; obtaining network specific information from the attribute store; incorporating the network specific information and the payload into the packet; and transmitting the packet to a network device to obtain a value of the first attribute. In certain embodiments, the method further comprises receiving a packet from the network device, wherein the packet contains the value of the first attribute; and updating the reported value of the first attribute to the value contained in the packet.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
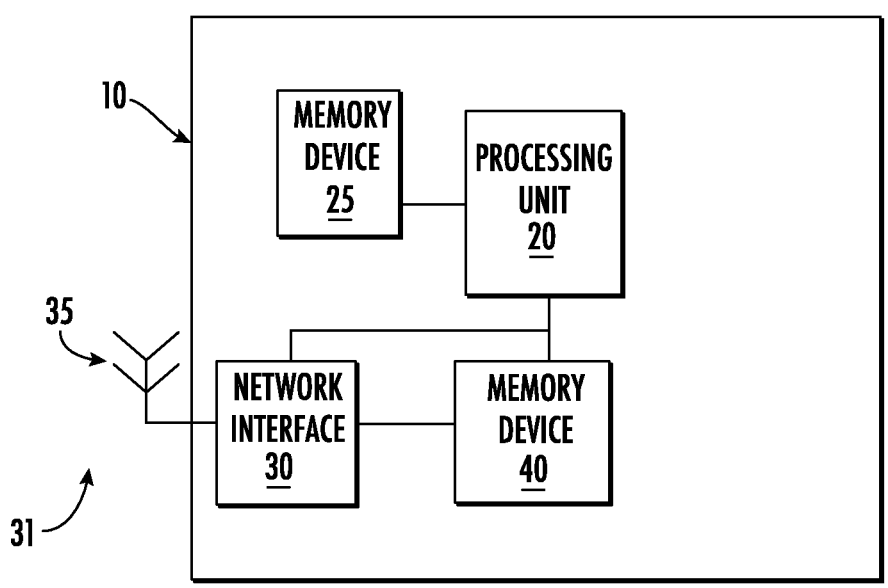
FIG. 1 is a block diagram of a representative network device.

FIG. 1 shows a block diagram of a representative network device 10. This network device may serve as an input device, an output device or a gateway controller, as described in more detail below.

As shown in FIG. 1, the network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The network device 10 also includes a network interface 30, which may be a wireless interface including an antenna 35. The network interface 30 may support any wireless network that supports multicast, such as Wi-Fi, networks utilizing the IEEE 802.15.4 specification, such as Zigbee, networks utilizing the IEEE 802.15.6 specification, and wireless smart home protocols, such as Z-Wave. The network interface 30 is used to allow the network device to communicate with other devices disposed on the network 31.

The network device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the network 31. Although not shown, the network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the network device 10. The instructions contained on this second computer readable media may be downloaded onto the memory device 25 to allow execution of the instructions by the network device 10.

While the processing unit 20, the memory device 25, the network interface 30, and the second memory device 40 are shown in FIG. 1 as separate components, it is understood that some or all of these components may be integrated into a single electronic component. Rather, FIG. 1 is used to illustrate the functionality of the network device 10, not its physical configuration.

Figure 2:
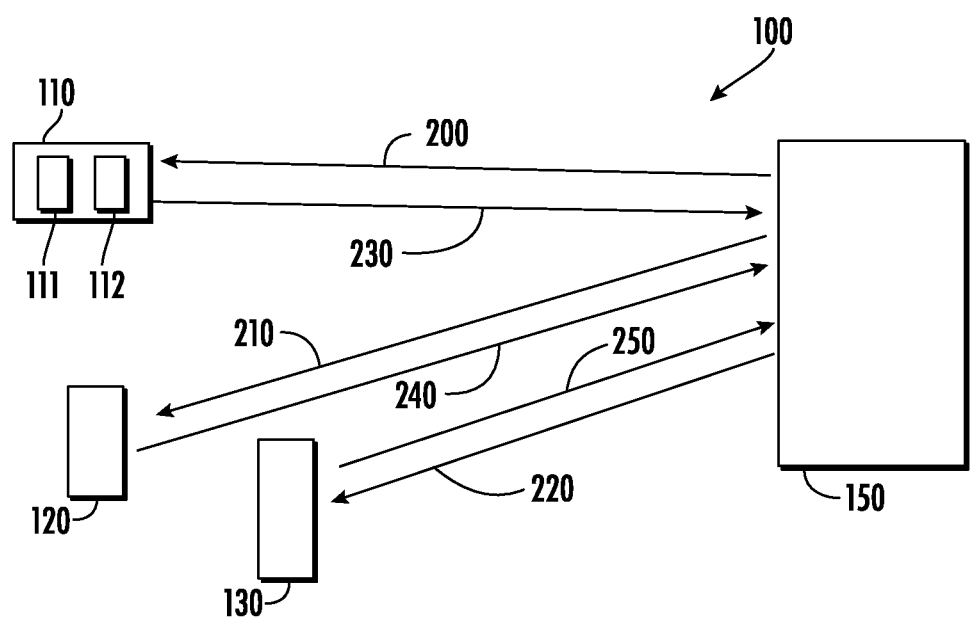
FIG. 2 shows communications occurring in a network having a plurality of network devices, including a gateway controller and a plurality of network devices according to one embodiment.

FIG. 2 shows a network 100 having a plurality of network devices and a gateway controller 150. The plurality of network devices may include one or more input devices, such as a wall switch 110, and one or more output devices, such as first light 120 and second light 130. The wall switch 110 may have a plurality of buttons 111, 112. Although a wall switch 110 is disclosed, the input device is not limited to this embodiment. The input device may also be a door bell, a sensor, such as a heat sensor, smoke sensor, motion sensor, thermometer, or any other input device. Similarly, the output devices need not be lights; other output devices, such as a window covering actuator, an audiovisual device, a door lock or a thermostat.

Each of these devices may be network devices having the components described above and shown in FIG. 1. The architecture of the gateway controller 150 may differ somewhat from that of the other devices. For example, the gateway controller 150 may have a more powerful processing unit 20. The memory device 25 and the second memory device 40 of the gateway controller 150 may be larger than that in other devices. Further, the gateway controller 150 may be powered by a wall outlet, rather than a battery.

In one particular embodiment, the network 100 may be a Z-WAVE network. The Z-WAVE protocol defines a plurality of command classes, such as Central Scene command class, Multilevel Switch command class, Color Switch command class, Sound Switch command class, Window Covering command class and others.

In certain embodiments, the gateway controller 150 may be required to know the value of each state or attribute in each network device that is part of the wireless network.

Thus, the gateway controller 150 may transmit packets 200, 210 and 220 to the wall switch 110, the first light 120 and second light 130, respectively. The devices may return information to the gateway controller 150 via packets 230, 240 and 250, respectively. The gateway controller 150 needs to save all of the information that it receives.

Figure 3:
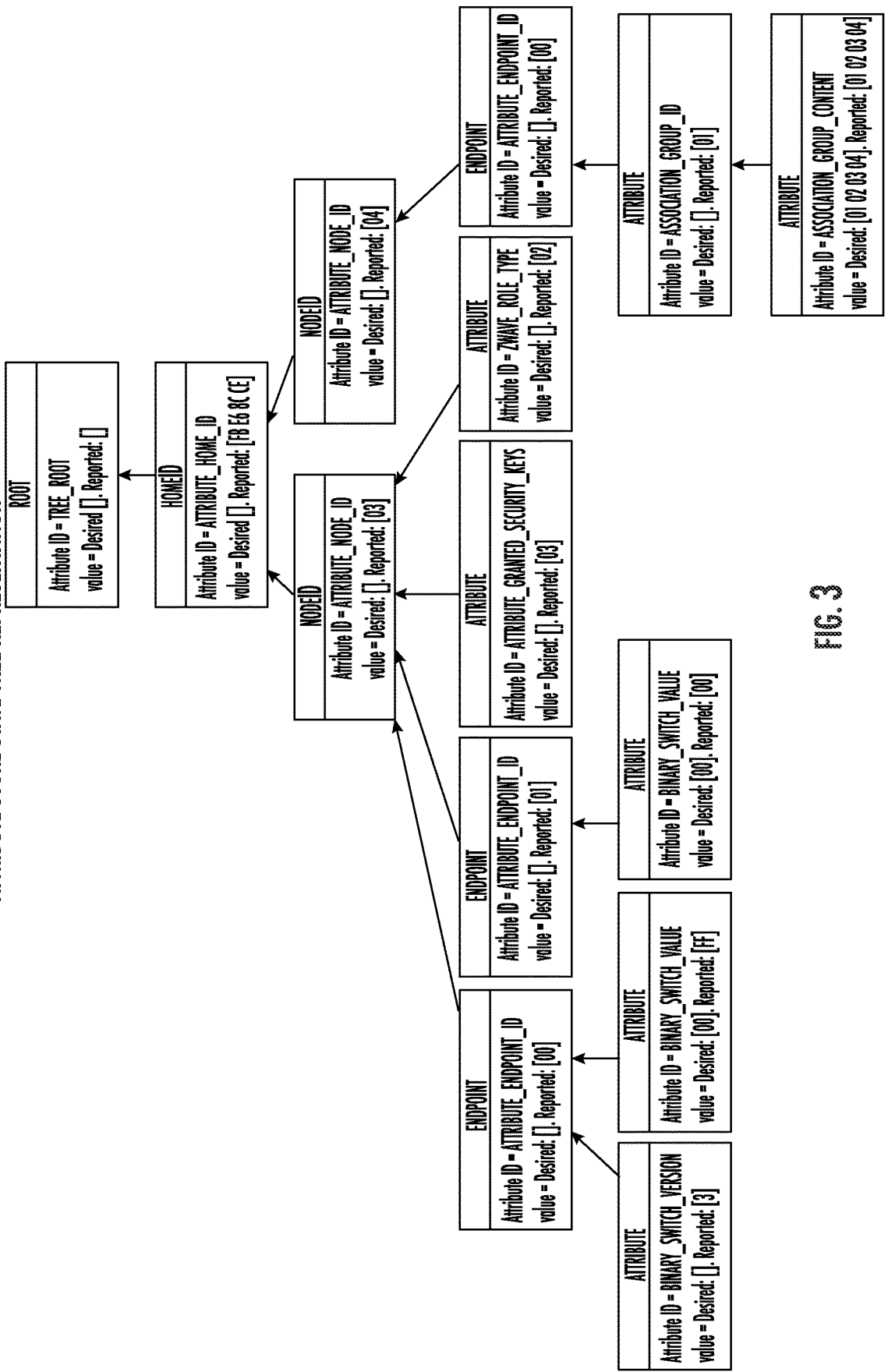
FIG. 3 shows a state tree representation according to one embodiment.

One approach is for the gateway controller 150 to create a state tree representation, such as is shown in FIG. 3. While this state tree representation is directed toward a Z-Wave embodiment, the concepts are equally applicable to other network protocols.

In this figure, each attribute or state in each network device in the wireless network is denoted by a box in the tree. The tree is organized in a hierarchical manner. Each box contains a type, which may be root, node, endpoint, attribute, or another type. Additionally, each box contains a state name. The box also includes the reported value of that state, as well as the desired value of that state.

As an example, the gateway controller 150 may be the root of the tree and have a HomeID of FB E6 8C CE. In other network protocols, this field may be referred to as the network ID. Additionally, the gateway controller 150 may be wirelessly connected to two nodes. The first node has a nodeID of 03, and has two endpoints and two attributes associated with it. One endpoint has an endpoint ID of 00 and includes two attributes, binary switch version and binary switch value. The second endpoint has an endpoint ID of 01 and has an attribute of binary switch value. Additionally, the two attributes associated with the first node are related to the security keys and the role type. For example, the state tree representation may store which keys have been granted to each node. The second node has a nodeID of 04 and has one endpoint associated with it. That endpoint has an endpoint ID of 00 and two attributes. In this configuration, the first attribute is the association group. The second attribute is an attribute of the first attribute and therefore is shown as a child of the first attribute. This second attribute represents the association group content. The association group content is a list of nodeIDs which belong to the association.

Association groups are a feature of Z-Wave. Each node can have a number of associations, each of which is a set of rules describing what happens when a given event occurs. For example, if a wall switch has one button, the rule might dictate that when the button is activated the gateway controller will send a BINARY_SWITCH_SET command to all nodes in group 1, and when the button is pressed, it will send a BASIC SET command to all nodes in group 2. Therefore, to represent the data of association, data needs to be stored under each group id.

Of course, there may be a different number of nodes, endpoints, and/or a different number or set of attributes and states for each node and endpoint. However, the boxes in this state tree representation, regardless of type, include a reported value and a desired value of its respective state. Further, to properly represent the state tree representation, each box also includes a parent, which is denoted by the lines that connect the various boxes in FIG. 3. By creating a state tree representation in this manner, the database may be usable with any network protocol.

This state tree representation allows a rule based system to be used to enumerate, query and update all of the attributes associated with the gateway controller 150.

To implement this approach, the software may be separated into a plurality of software modules or programs. Some of these software modules or programs may be generic, in that they are usable with any network protocol. Others of these software modules may be specific to the network protocol.

Figure 5:
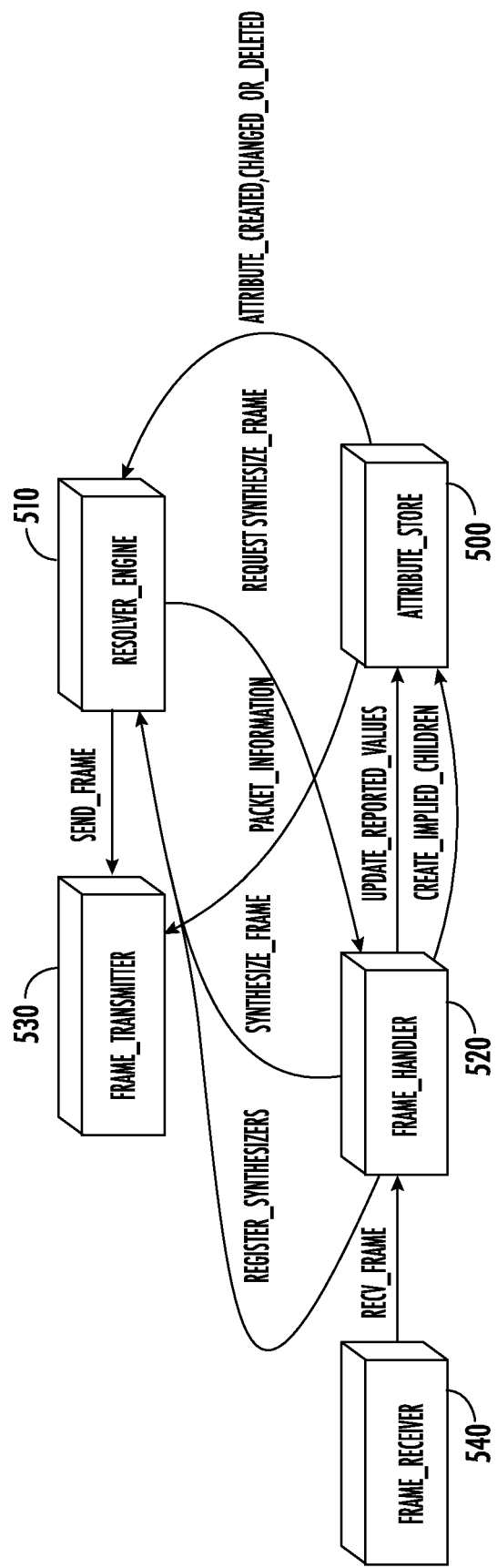
FIG. 5 shows a block diagram illustrating the architecture of the software on the gateway controller.

A block diagram of a representative software architecture is shown in FIG. 5. This block diagram represents a software system, comprising a plurality of different software modules. Each software module is disposed on a non-transitory storage medium that may be read and executed by the processing unit 20. For example, each software module may reside in memory device 25.

FIG. 5 shows a data structure which serves as the attribute store 500. The attribute store 500 is organized to be the state tree representation, which is stored in the memory device 25. As described in more detail below, the attribute store 500 is readable and writable by the processing unit 20. The format of the attribute store 500 is such that it may be used with any network protocol.

Various software modules are also shown. These modules may include a resolver engine 510, a frame transmitter 530, the frame handler 520 and a frame receiver 540. The resolver engine 510 is responsible for resolving information at initialization and updating information as required. The resolver engine 510 is also generic to all network protocols.

The frame transmitter 530 is utilized to transmit packets to the intended network device using a specific network protocol. The frame transmitter 530 may also be responsible for creating any network specific fields for the frame, such as destination node, source node, encryption scheme and others.

The frame receiver 540 is responsible for accepting incoming packets. Like the frame transmitter 530, the frame receiver 540 is specific to the network protocol being used.

The frame handler 520, which is also unique to a particular network protocol, is a plurality of synthesizer functions that are responsible for parsing the incoming packets and creating payloads for outgoing packets.

More specifically, a packet may be received by the frame receiver 540. This received packet is sent to the frame handler 520, which parses the information contained in the packet. This information may include reported values for certain attributes in the attribute store 500. In this case, the frame handler 520 will update the attribute store 500 with the new reported value. In certain embodiments, the newly reported value of a particular attribute will imply that there are other attributes associated with that particular attribute. For example, an attribute of ASSOCIATION_GROUP_ID may have a child attribute associated with it. The frame handler 520 may then create these new implied child attributes in the attribute store 500.

The resolver engine 510 is responsible for determining what information in the attribute store 500 needs to be obtained or modified. For example, the resolver engine 510 may receive a notification from the attribute store 500 that a new attribute has been created or modified. In response, the resolver engine 510 will send a frame synthesis request to the frame handler 520. The appropriate synthesizer function in the frame handler 520 will then synthesize the necessary packet and return that packet to the resolver engine 510. The resolver engine 510 then passes this packet to the frame transmitter 530, which adds the header and other network specific information and sends the packet to the intended network device.

Each of the actions that are performed by the processing unit 20 will be described in more detail.

The first step is to register the rules with the resolver engine 510. The resolver engine 510 is designed to be generic so that it may be used with any network protocol.

However, the rules and commands for each network protocol may differ. Consequently, the rules that are registered with the resolver engine 510 are unique for a particular network protocol. If, for example, the resolver engine 510 is to be used in a gateway controller that operates on a Z-Wave network, the frame handler 520 will be specific to Z-Wave. Each of the synthesizer functions in the frame handler 520 will register its rule with the resolver engine 510. A rule may have the following format:

<attribute_id, GET_synthesizer, SET_synthesizer>

Thus, the resolver engine 510 has a rule book, where each rule has a particular attribute and the SET and GET synthesizer functions that are associated with that attribute. This plurality of SET and GET synthesizers comprise the frame handler 520.

In other words, when the resolver engine 510 encounters a situation where the value of the particular attribute is to be obtained, it refers to the rule associated with that particular attribute and calls the GET synthesizer function that is identified in the rule. Similarly, when the resolver engine 510 encounters a situation where the value of the particular attribute is to be modified, it refers to the rule associated with that particular attribute and calls the SET synthesizer function that is identified in the rule.

Additionally, a send function may also be registered with the resolver engine 510. The send function is used to actually transmit the packet and may be network specific. Thus, the frame transmitter 530 may also register with the resolver engine 510, such that the resolver engine 510 uses a particular send function for each particular network protocol.

Once the various software functions are enumerated and registered, the gateway controller 150 must create the attribute store 500 that is organized as the state tree representation. This function may be performed by the resolver engine 510 in certain embodiments. In other embodiments, a network-specific software module may be used to create the state tree representation or at least part of that representation.

During the network discovery procedure, each time a new node is discovered, the node and its node ID are added to the state tree representation at the level directly below the HomeID box, as shown in FIG. 3. In other words, the state tree is built by iteratively collecting information.

The following explains the process of creating the state tree representation.

When the gateway controller 150 is reset, the network is empty and the attribute store 500 only includes one HomeID node and the NodeID node of the gateway controller itself.

When a network device is added to the network, the NodeID of the new network device is added. The information known about the node and its inclusion time is also added. For example, this information may include the granted security keys and the Z-Wave Node Information (NIF) frame and the fact that a node always has endpoint 0. The NIF frame has a list of Z-Wave command classes which the node supports (an example of a command class is BINARY_SWITCH).

The attribute store 500 has a callback system which allows functions to be executed by the resolver engine 510 whenever an attribute is created, deleted or changes value. As shown in FIG. 5, the attribute store 500 communicates to the resolver engine 510 whenever an attribute is created, changed or deleted. A callback in the attribute store 500 is monitoring the NIF attribute, when this changes, a version attribute is created for each command class, which does not have either a desired or reported value. Now the resolver engine 510 executes because it has a rule registered for the version attribute. It requests that the frame handler 520 synthesize the packet and then transmits this packet using the frame transmitter 530.

When the version of a command class is obtained, a monitor function is registered for this command class. For example, one such version of a command class may be the BINARY_SWITCH_VERSION attribute. This monitor will create the BINARY_SWITCH_VALUE attribute. If the version is greater than 1, the monitor function also creates a BINARY_SWITCH_CAPABLITIES attribute. Again, this attribute has resolution rule assigned which allows the information to be resolved.

In certain embodiments, some Z-Wave frame handlers will not only set the reported values in the attribute store 500 but also create new attributes, which allows for further resolution. For example, the ASSOCIATION_GROUPINGS_REPORT frame handler will read that a node has 3 association groups, so it will create the 3 ASSOCIATION_GROUP_ID attributes in the attribute store 500 and under each group id, will add an ASSOCIATION_GROUP_CONTENT attribute (with no desired or reported value). Again, the resolver engine 510 will execute and fetch the needed information.

This process continues until all nodes and attributes have been resolved.

Further, if during a network discovery procedure, it is determined that a node is no longer part of the network, the state tree representation may be updated by deleting the node. Further, all attributes associated with that node (i.e. all boxes that have the deleted node as the parent) are also deleted.

Thus, after discovery has been completed, the attribute store 500 having a state tree representation of every node in the network is created. Once created, the gateway controller 150 may query the various states to find their reported values. This may be achieved as follows.

At initialization, the reporting value for each state and attribute may be set to a null value, which indicates that the value has not been reported or is unknown. In other embodiments, an initial value may be known. A tree discovery engine may be utilized to parse the state tree and discover all attributes that do not have a reported value. In certain embodiments, the tree discovery engine is separate from the resolver engine 510. For example, the tree discovery engine may be incorporated into the attribute store 500. In other embodiments, this functionality may be incorporated into the resolver engine 510. Once the tree discovery engine finds a reported value that is a null value, the tree discovery engine passes the attribute to the resolver engine 510. The resolver engine 510 then requests that a frame be synthesized by the frame handler 520 using the appropriate GET frame synthesizer. The frame handler 520 uses the context of the attribute to construct the payload of the frame with the appropriate command and parameters. Once the payload of the frame has been synthesized, the frame handler 520 indicates that the frame has been synthesized, as shown in FIG. 5. The resolver engine 510 then forwards the payload to the frame transmitter 530, which adds network specific information and transmits the packet.

GET synthesizer functions are used to obtain the value of a state or attribute from a node, endpoint or other device. In certain embodiments, the rules are specific to the type of attribute that is being queried. For example, the GET synthesizer function used for the different endpoints of Node 03 to determine the value of the BINARY_SWITCH_VALUE may be the same. However, this GET synthesizer function may be different from the GET synthesizer function used to obtain the BINARY_SWITCH_VERSION. The GET synthesizer functions may be manually generated. In other embodiments, some or all of the synthesizer functions may be automatically generated from the XML file.

As shown above, a rule may have the following format:
<attribute_id, GET_synthesizer, SET_synthesizer>

In other words, for each attribute type, there is a GET synthesizer function which is used to create the payload of the frame that is needed to obtain the value of that attribute from a network device; and a SET synthesizer function which is used to create the payload of a frame that is needed to modify the value of that attribute from a network device.

In certain embodiments, the state tree representation described above may be used with a Z-Wave wireless network. In this embodiment, each command class may have a dedicated GET synthesizer function. In some further embodiments, each attribute associated with each command class may have a dedicated GET synthesizer function.

In each case, the resolver engine 510 selects the appropriate GET synthesizer function to generate the payload for a packet that requests the value of the attribute or state in question. In certain embodiments, the various parameters in the packet may be populated based on the position of the attribute in the state tree representation, as explained in more detail below. The resolver engine 510 may use other reported states to generate the frame. One example may be as follows: "what is the association group ID of endpoint 00 in Node 04". In this case, the frame transmitter 530 would use information from the state tree representation, namely, the NodeID and the endpoint number. The resolver engine 510 then uses the appropriate GET synthesizer function o generate the payload of a packet directed to this endpoint with the specific command needed to trigger the endpoint to return the value of the association group.

Figure 6:
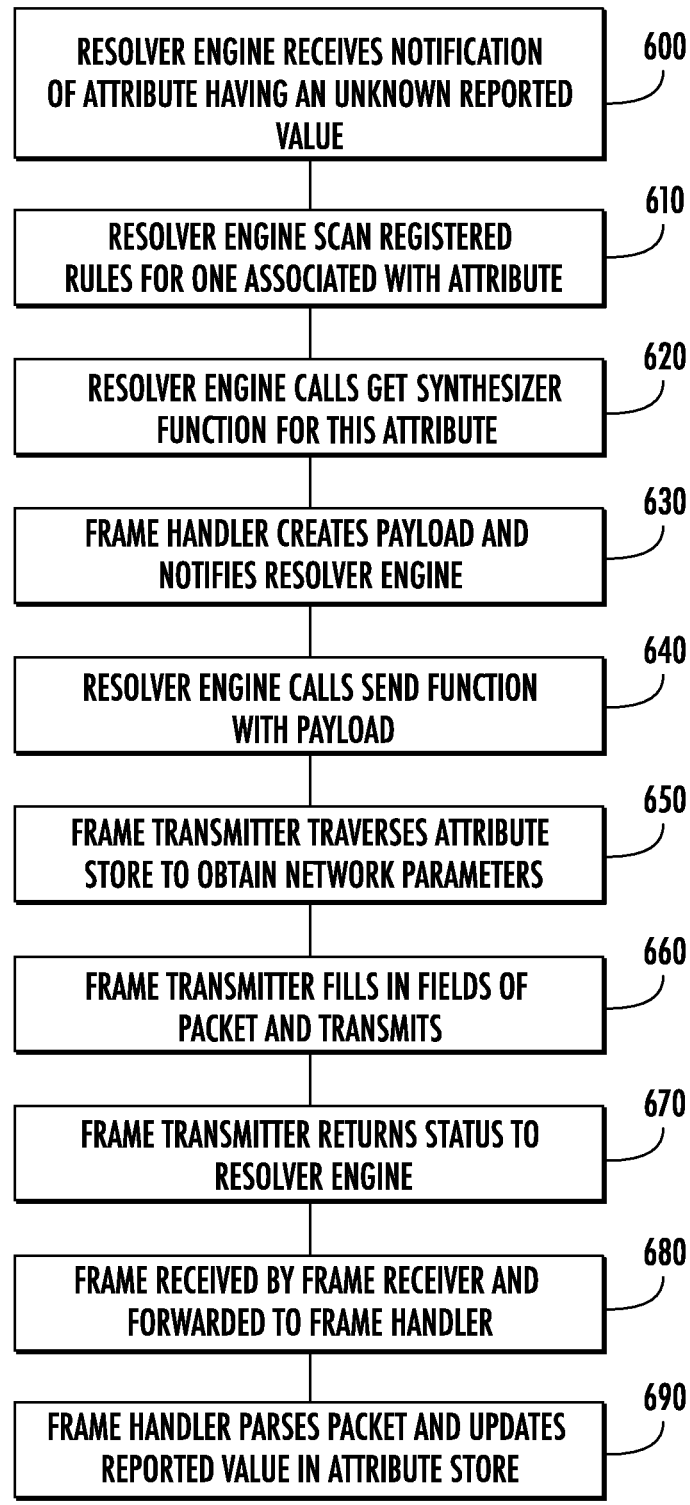
FIG. 6 shows a sequence that may be executed to obtain the value of an attribute.

FIG. 6 shows the steps used to obtain the value of an attribute in the attribute store 500. First, as shown in Box 600, the resolver engine 510 may receive a callback or notification from the attribute store 500 that the reported value of a certain attribute is now null, or unknown. In response, the resolver engine 510 will scan the registered rules to find the rule associated with this attribute, as shown in Box 610. The resolver engine 510 will then call the GET synthesizer function in the frame handler 520 that is associated with this attribute, as shown in Box 620. The frame handler 520 will create the payload for the packet that is to be used to obtain the value of this parameter and notify the resolver engine 510 when complete, as shown in Box 630. The frame handler 520 may also return status associated with this payload. The status may report success, instruct the resolver engine not to send the frame, or inform the resolver engine 510 that additional frames are required. The resolver engine 510 will then call the send function (i.e. the frame transmitter 530) and pass the payload to the frame transmitter 530, as shown in Box 640. The frame transmitter 530 will then parse the attribute store 500 based on the location of this attribute within the tree, as shown in Box 650. Once found, the frame transmitter 530 will navigate upward to determine the endpoint and node that this packet is intended for. The frame transmitter 530 will then create the network specific fields of the packet, such as destination node, source node, encryption scheme and other fields, and then transmit the completed packet, as shown in Box 660. Finally, the frame transmitter 530 returns status to the resolver engine 510 regarding the success of the transmission, as shown in Box 670.

Note that the attribute store 500 and the resolver engine 510 need not have any knowledge of the network protocol that is being used. That information is exclusively contained in the frame handler 520 and the frame transmitter 530.

At a later time, a packet may be received that contains the value of the attribute in question. This is received by the frame receiver 540 and passed to the frame handler 520, as shown in Box 680. The frame handler 520 then parses the packet and updates the attribute reported value in the attribute store 500, as shown in Box 690. The attribute store 500 may then send a notification or callback to the resolver engine 510 indicating that the reported value of the attribute has been updated. Alternatively, the frame handler 520 may notify the resolver engine 510 when it receives the attribute value.

Figure 7:
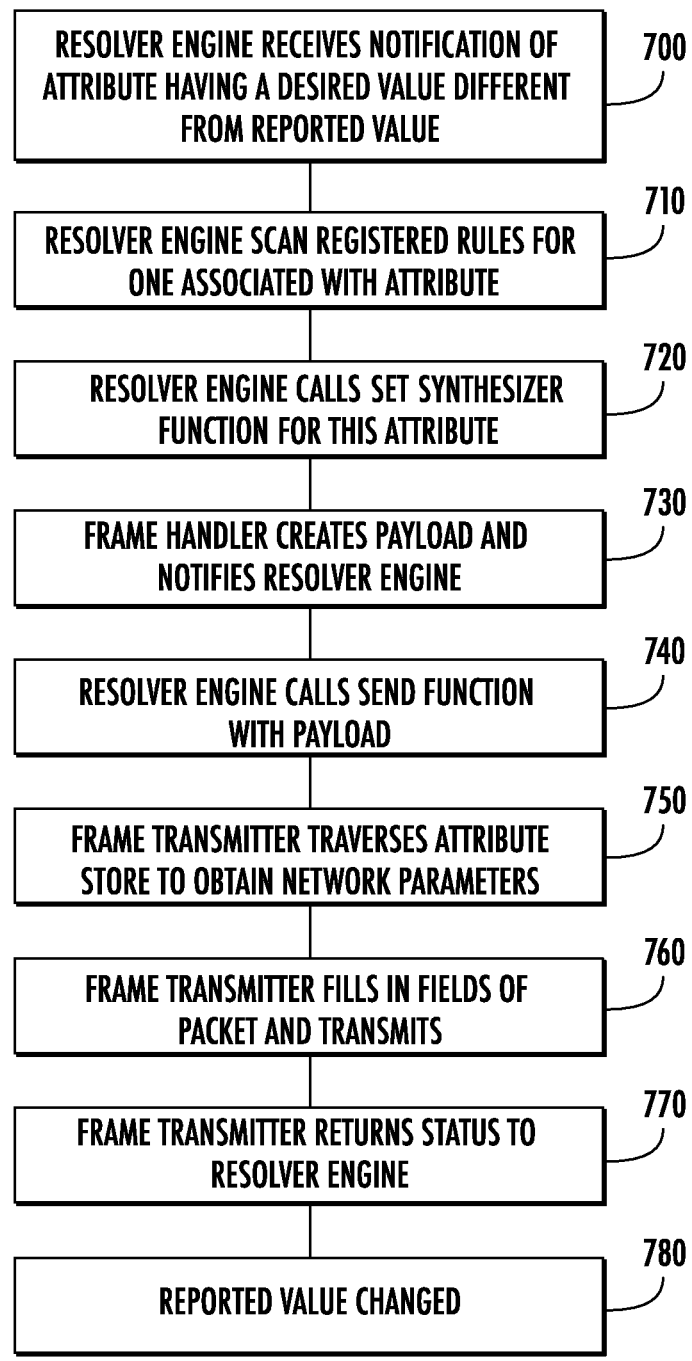
FIG. 7 shows a sequence that may be executed to modify the value of an attribute.

In addition to obtaining the current value of the various states or attributes, it may be advantageous to change or set the value of one or more of these attributes or states. Thus, SET synthesizer functions may be used to modify the value of a state or attribute. For example, if the desired value of a state or attribute is different from the reported state, a SET synthesizer function may be invoked. FIG. 7 shows the sequence of steps used to modify the value of an attribute.

First, the desired value of an attribute is updated such that it differs from the reported value. For example, a user interface may be used to change a desired value. In addition, actions by other network devices may cause the desired value of an attribute to change. When the desired value does not match the reported value, the attribute store 500 may send a callback or notification to the resolver engine 510, as shown in Box 700. In response, the resolver engine 510 scans the registered rules as shown in Box 710, and selects a SET synthesizer function to generate the payload for a packet that instructs the node or endpoint to set a certain state or attribute to the desired value, as shown in Box 720. One example may be as follows: "change the association group ID of endpoint 00 in Node 04 to 05". In this case, the SET synthesizer function would use information passed from the resolver engine 510 namely, the attribute and the desired value. The SET synthesizer function would then generate the payload for a packet with the specific command needed to trigger the endpoint to modify the value of the association group ID. The frame handler 520 then notifies the resolver engine 510 that the payload has been created, as shown in Box 730.

The resolver engine 510 then passes the payload to the send function (i.e. the frame transmitter 530), as shown in Box 740.

The frame transmitter 530 will then parse the attribute store 500 based on the location of this attribute within the tree, as shown in Box 750. Once found, the frame transmitter 530 will navigate upward to determine the endpoint and node that this packet is intended for. The frame transmitter 530 will then create the network specific fields of the packet, such as destination node, source node, encryption scheme and other fields, and then transmit the completed packet, as shown in Box 760. Finally, the frame transmitter 530 returns status to the resolver engine 510 regarding the success of the transmission, as shown in Box 770. In certain embodiments, the frame transmitter 530 may receive immediate confirmation from the destination node that the attribute has been updated. In this case, the reported value of the attribute is now updated to the desired value, as shown in Box 780. However, in other embodiments, the destination node may not provide confirmation that the attribute has been modified. In this embodiment, the reported value of the attribute may be set to a null value, as shown in Box 780. This action will result in a notification being sent to the resolver engine 510, which will trigger the start of the process shown in FIG. 6.

Using the GET and SET synthesizer functions, the resolver engine 510 can collect and modify data in the IoT network by using the following logic:

If a reported value of a state is not found and a rule exists for this state, request the frame handler 520 to build a frame using the associated GET synthesizer function and send the frame using the frame transmitter 530. When a "REPORT" frame is received from the network device, the reported state is updated in the state tree. In this way, the resolver logic will not be executed again.

If the desired value of a state differs from the reported value and a SET rule exists for the state, use the appropriate SET synthesizer function to build the appropriate payload for the packet and send it using the frame transmitter 530. If a device supports application-level verification, such as Z-Wave supervision or a similar protocol, the reported value of the state may be updated upon receiving the verification. If, however, the device does not support application-level verification, the reported and the desired value of the state may be cleared after delivering the packet. Clearing the reported value will trigger the resolver engine 510 to call the appropriate GET synthesizer function to verify the most recent reported state value, which hopefully will verify that the previously sent desired value has been accepted. Clearing the desired value will ensure that no further retransmission of the packet created by the SET rule.

Figure 4:
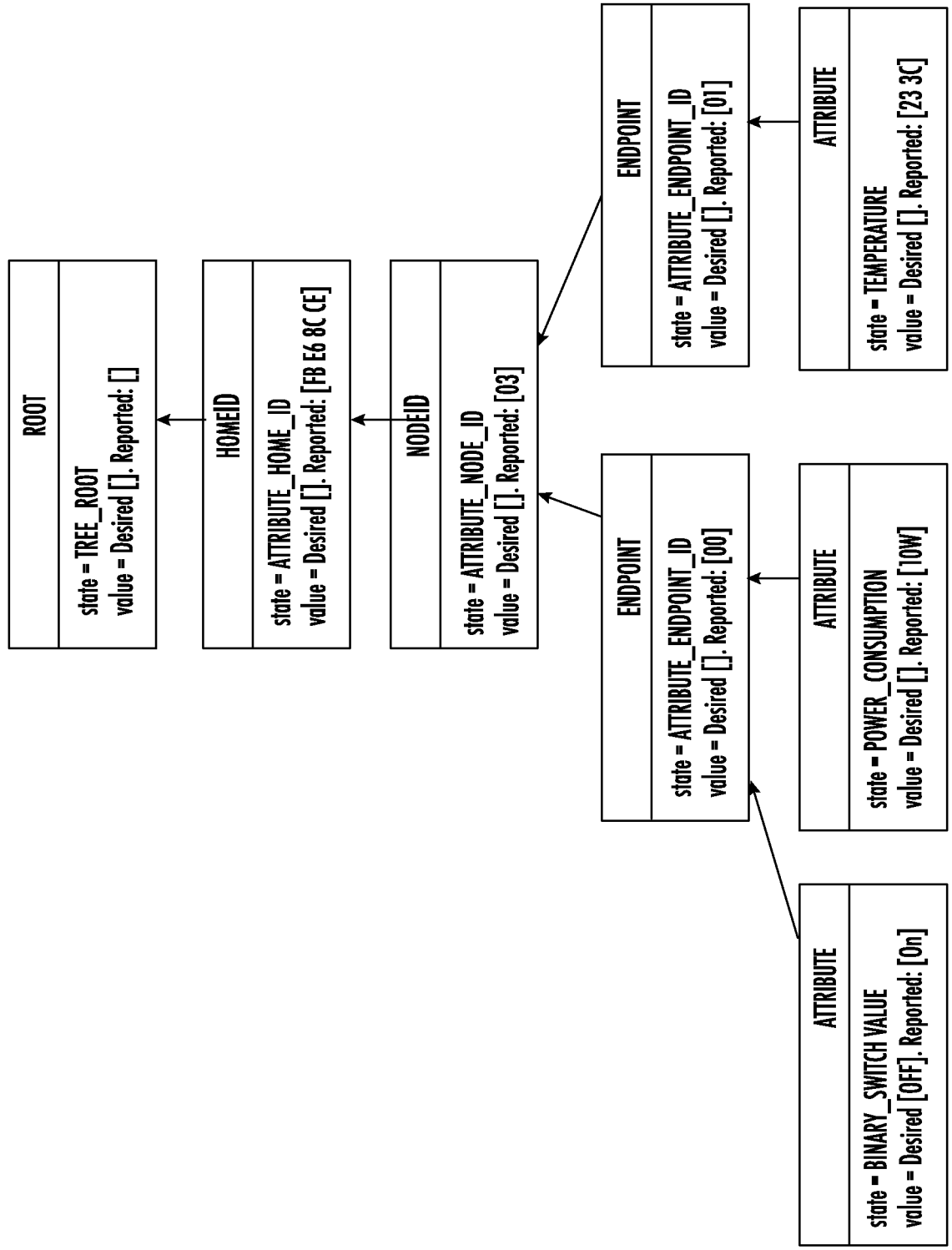
FIG. 4 shows a state tree representation according to a second embodiment.

The following provides a detailed example of the use of the state tree representation, and the GET and SET synthesizer functions. In this example, it is assumed that the wireless protocol is Z-Wave, although other protocols may be used. The configuration of the Z-Wave network may be represented by the state tree shown in FIG. 4.

In Z-Wave, the state of a light will be controlled by three data frames:

BINARY_SWITCH_SET
BINARY_SWITCH_GET
BINARY_SWITCH_REPORT

The command BINARY_SWITCH_SET is used to set the state of a light. The binary representation of this command is as follows:

[0x25,0x01, <value>], where a value of 0 will make the light turn off and any other value will make the light turn on.

The command BINARY_SWITCH_GET is used to trigger the light to send a BINARY_SWITCH_REPORT. The binary representation of the BINARY_SWITCH_REPORT command is [0x25, 0x02].

The command BINARY_SWITCH_REPORT is sent by a light as a response to a BINARY_SWITCH_GET command. The binary representation of the command is as follows:

[0x25, 0x03, <value>], where value is the current state of the lamp, wherein 0 indicates that the light is off and any other value indicates that the light is on.

For a light supporting the BINARY_SWITCH command, there is one state variable related to the BINARY_SWITCH_VALUE. The lamp may have many other states as well, but those are not included in this example.

It is now evident that two frame synthesizer functions can be registered for the BINARY_SWITCH_VALUE state; a GET synthesizer function that is used to construct payloads for packets to obtain values of the BINARY_SWITCH_VALUE state from the network device and the SET synthesizer function that is used to construct payloads for packets to modify values of the BINARY_SWITCH_VALUE state.

The resolver engine 510 will monitor all attributes of the type of BINARY_SWITCH_VALUE in the attribute store 500 and call the registered frame synthesizer functions when needed. In certain embodiments, the monitoring of the attributes is performed by a callback function disposed within the attribute store 500.

The resolver engine 510 will locate a state variable in the state tree: {type:node,reported: 3}→
 {type:endpoint,reported:0}→
 {type:binary_switch_value,desired:null, reported:null}.

Since the value of the light is unknown, the resolver engine 510 needs to find the rule for the BINARY_SWITCH_VALUE attribute. The rule associated with the BINARY_SWITCH_VALUE attribute contains two synthesizers; the GET synthesizer function and the SET synthesizer function. The GET synthesizer function is called and given {type: BINARY_SWITCH_VALUE, reported: null} as a parameter. For this command, the parsed object is not actually used since the frame payload is static for this command. Once the frame is synthesized, it is passed to the frame transmitter 530, which may construct the rest of the frame data based on the path in the state tree, in this case node:03, endpoint:00. The frame transmitter 530 then sends the packet to the desired destination node.

Now the network device responds to the packet transmitted from the gateway controller 150 by sending a BINARY_SWITCH_REPORT which is received by the frame receiver 540. In this example, assume that the network device responds with a value of 0xff for the BINARY_SWITCH_VALUE attribute. Upon receiving this packet from node:03,endpoint:00, the state variable:
 {type:node,reported: 3}→
 {type:endpoint,reported:0}→
 {type:BINARY_SWITCH_VALUE, reported:null}
is located in the tree.

This BINARY_SWITCH_VALUE is then updated as follows: {type: BINARY_SWITCH_VALUE, desired:null, reported:0xff}.

The resolver engine 510 now knows that the BINARY_SWITCH_VALUE attribute is fully resolved.

If it is now desired to turn off the light, the state parameter is set as follows:
 {type:node,reported: 3}→
 {type:endpoint,reported:0}→
 {type: BINARY_SWITCH_VALUE, reported:0xff, desired:0x00}.

The resolver engine 510 sees a mismatch between the desired and reported value. Alternatively, a callback function within the attribute store 500 may detect this mismatch and transmit a notification or callback to the resolver engine 510. The resolver engine 510 then finds the rule associated with the BINARY_SWITCH_VALUE attribute and calls the SET frame synthesizer, again with the object {type: BINARY_SWITCH_VALUE, reported:0xff, desired:0x00} as an argument. This SET frame synthesizer will read the desired value of the state and generated the payload for the frame. The frame transmitter is the same module as used with the GET synthesizer functions. If the device has positively acknowledged that the set operation has been carried out, the reported and desired values are set to the same value. If the device is not able to verify this, the reported value is cleared to trigger a new GET rule. In Z-Wave, this depends on if the device supports the SUPERVISION command class; other RF technologies may have other means to doing this verification.

Furthermore, the resolver engine 510 can be extended to temporary exempt branches of the state tree from being resolved. This feature may be used to handle nodes which are known to be temporarily offline, such as Z-Wave wakeup nodes or Zigbee sleepy devices. For example, the frame handler 520 may receive a packet from a particular node indicating that it is entering sleep mode. The frame handler 520 may inform the resolver engine 510 to pause all actions associated with a particular node or endpoint in the network since the particular node or endpoint is unavailable. This pause also includes all attributes that are children of that node or endpoint. At a later time, the frame handler 520 may receive a message from that node indicating that it is now awake. In response, the frame handler 520 will notify the resolver engine 510 to resume operations to that node or endpoint and all child attributes associated with that node or endpoint.

Another feature of the state manager is that, by utilizing a set of rules, it is easy to determine which state adjustments yields identical frame data. This system can be used to determine if a state can be resolved by using multicast frame to several nodes at the same time. As each attribute has a unique SET synthesizer function, it can be deduced that the application frame data (i.e. the payload) for two state variables of the same type may be identical.

In other words, keeping all state information in the state tree allows detection of whether more than one state can be resolved using a multicast frame. The algorithm for doing this may be as follows:
1. Build a set of all states that needs a resolution;
2. Pick an element from the set to resolve;
3. Check if there are other states in the set with the same type;
4. If the frame synthesizer for the states generates identical payloads and have encryption class, this frame can be resolved by multicast.

This functionality may be incorporated in the frame transmitter 530 or in the resolver engine 510.

Thus, in one embodiment, a system for use with a network controller is disclosed. The system comprises a plurality of software modules, including an attribute store 500, a resolver engine 510, a frame handler 520, a frame transmitter 530 and a frame receiver 540. As described above, the attribute store 500 and the resolver engine 510 may be configured such that they are usable with any network protocol. The remaining modules are tailored to the specific network protocol used by the network controller.

In another embodiment, a gateway controller having the above mentioned software is disclosed. The controller includes a processing unit 20, a network interface 30, and at least one memory device 25 in communication with the processing unit 20. The memory device comprises data structures and instructions that enable the processing unit to execute the software modules described above.

In another embodiment, a method of obtaining and modifying attributes in a network is disclosed. The method comprises populating an attribute store which is a state tree representation of the nodes and their associated attributes. The method further comprises using a set of rules, where each type of attribute has a rule associated with it, where the rule includes a GET synthesizer function and a SET synthesizer function. The method further includes selecting the appropriate GET synthesizer function when an attribute in the attribute store has an unknown reported value. The method further comprises selecting an appropriate SET synthesizer function when the reported value of an attribute does not match the desired value of that attribute.

The present system has many advantages. First, the resolver engine 510 and the attribute store 500 are network protocol agnostic. In other words, the same software may be used for Z-Wave, Bluetooth, Zigbee or other network protocols. This may reduce the development time associated with creating software for controllers in the future. Further, the architecture described herein is very flexible. In other words, there is no restrictions on what may be categorized as an attribute. As an example, if desired, an attribute may be created named "Firmware update". Associated with this attribute may be specific rules that enable the frame handler 520 to create packets that serve to deliver new firmware updates to desired nodes. This concept also applies to any other attribute that may be desirable.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A software system for use with a network controller, comprising a plurality of software modules, disposed on a non-transitory computer readable storage medium, the plurality of software modules comprising:
   an attribute store, to store information about each node in a network and attributes associated with each node;
   a resolver engine to determine an action to perform based on values of the attributes in the attribute store;
   a frame handler, comprising a plurality of synthesizer functions to create a payload based on the action requested by the resolver engine;
   a frame transmitter to incorporate the payload and network specific information to form a packet and to transmit the packet to a network device; and
   a frame receiver to receive incoming packets and forward the incoming packets to the frame handler.

2. The software system of claim 1, wherein the resolver engine and the attribute store are configured to be operable with a plurality of different network protocols without modification.

3. The software system of claim 1, wherein the attribute store is configured as a state tree representation, wherein each attribute has a parent, a type, a reported value and a desired value.

4. The software system of claim 3, wherein the frame handler registers rules with the resolver engine, such that for each type of attribute, a rule is registered which defines a GET synthesizer function to create the payload to obtain a value of the attribute and a SET synthesizer function to create the payload to modify the value of the attribute.

5. The software system of claim 4, wherein the resolver engine calls the SET synthesizer function associated with an attribute if the desired value of the attribute differs from the reported value of the attribute.

6. The software system of claim 4, wherein the resolver engine calls the GET synthesizer function associated with an attribute if the reported value of the attribute is a null value.

7. The software system of claim 4, wherein the frame transmitter obtains the network specific information to form a packet from the attribute store.

8. The software system of claim 5, wherein the frame transmitter returns status to the resolver engine and the attribute store is updated based on the status.

9. The software system of claim 8, wherein the reported value of the attribute is updated to the desired value if the network device reports that the attribute was successfully modified.

10. The software system of claim 8, wherein the reported value of the attribute is updated to a null value if the network device does not report that the attribute was successfully modified.

11. The software system of claim 3, wherein the resolver engine receives a notification that a node is unavailable and is configured to pause all operations related to the node and any child attributes related to the node.

12. The software system of claim 3, wherein the frame transmitter determines that multiple packets are associated with one attribute and creates a multicast packet to combine the multiple packets.

13. The software system of claim 3, wherein the frame receiver receives a packet from a network device and the reported value of an attribute is updated based on data in the packet.

14. A network controller, comprising:
a processing unit;
a network interface; and
a memory device, wherein the software system of claim 1 is disposed in the memory device.

15. A method of operating a network controller, comprising:
creating an attribute store in the network controller, wherein the attribute store is configured as a state tree representation, to store information about each node in a network and attributes associated with each node, wherein each attribute has a reported value and a desired value;
detecting that the reported value does not match the desired value for a first attribute;
finding a rule associated with the first attribute, wherein each rule comprises a GET synthesizer function and a SET synthesizer function associated with the attribute;
using the SET synthesizer function defined in the rule associated with the first attribute to create a payload for a packet;
obtaining network specific information from the attribute store;
incorporating the network specific information and the payload into the packet; and
transmitting the packet to a network device to modify a value of the first attribute.

16. The method of claim 15, wherein the reported value of the first attribute is updated to the desired value if the network device reports that the first attribute was successfully modified.

17. The method of claim 15, wherein the reported value of the first attribute is updated to a null value if the network device does not report that the attribute was successfully modified.

18. A method of operating a network controller, comprising:
creating an attribute store in the network controller, wherein the attribute store is configured as a state tree representation, to store information about each node in a network and attributes associated with each node, wherein each attribute has a reported value and a desired value;
detecting that the reported value for a first attribute is a null value;
finding a rule associated with the first attribute, wherein each rule comprises a GET synthesizer function and a SET synthesizer function associated with the attribute;
using the GET synthesizer function defined in the rule associated with the first attribute to create a payload for a packet;
obtaining network specific information from the attribute store;
incorporating the network specific information and the payload into the packet; and
transmitting the packet to a network device to obtain a value of the first attribute.

19. The method of claim 18, further comprising:
receiving a packet from the network device, wherein the packet contains the value of the first attribute; and
updating the reported value of the first attribute to the value contained in the packet.

* * * * *